United States Patent
Pentikäinen

(10) Patent No.: US 6,445,905 B1
(45) Date of Patent: Sep. 3, 2002

(54) METHOD OF PREVENTING DATA INCONSISTENCY BETWEEN MASTER EXCHANGE DATA AND BACKUP EXCHANGE DATA

(75) Inventor: Jukka Pentikäinen, Tampere (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/194,074
(22) PCT Filed: Mar. 20, 1998
(86) PCT No.: PCT/FI98/00245
§ 371 (c)(1), (2), (4) Date: Nov. 20, 1998
(87) PCT Pub. No.: WO98/43450
PCT Pub. Date: Oct. 1, 1998

(30) Foreign Application Priority Data

Mar. 21, 1997 (FI) .................................................. 971209

(51) Int. Cl.⁷ .................................................. H04Q 7/00
(52) U.S. Cl. .............................. 455/8; 455/9; 707/201; 714/6
(58) Field of Search .................................. 707/200, 201, 707/202, 204, 205; 709/221; 714/6, 11; 455/56.1, 518, 8, 9, 67.1, 433

(56) References Cited

U.S. PATENT DOCUMENTS

| | | | |
|---|---|---|---|
| 4,610,013 A | * 9/1986 | Long et al. .................... 714/11 |
| 5,060,185 A | * 10/1991 | Naito et al. .................. 707/202 |
| 5,136,707 A | * 8/1992 | Block et al. ................. 707/201 |
| 5,155,729 A | * 10/1992 | Rysko et al. .................. 714/11 |
| 5,390,335 A | * 2/1995 | Stephan et al. ............. 709/221 |
| 5,561,854 A | * 10/1996 | Antic et al. .................. 445/433 |
| 5,594,942 A | * 1/1997 | Antic et al. ................ 455/33.1 |
| 5,752,196 A | * 5/1998 | Ahvenainen et al. ....... 455/518 |
| 5,806,074 A | * 9/1998 | Souder et al. ............... 707/201 |
| 6,035,412 A | * 3/2000 | Tamer et al. .................... 714/6 |

FOREIGN PATENT DOCUMENTS

| | | |
|---|---|---|
| EP | 366 341 | 5/1990 |
| EP | 702 496 | 3/1996 |
| WO | 96/21985 | 7/1996 |
| WO | 96/29838 | 9/1996 |

OTHER PUBLICATIONS

Patent Abstract of Japan, vol. 16, No. 130 JP 3–292035, Dec. 1991.

* cited by examiner

Primary Examiner—Zarni Maung
Assistant Examiner—Wen-Tai Lin
(74) Attorney, Agent, or Firm—Pillsbury Winthrop, LLP

(57) ABSTRACT

The present invention relates to preventing inconsistency between the data maintained in a master exchange and a backup exchange in a telecommunication system. To ensure a reliable data distribution, the system maintains a copy of the master exchange data in a slave exchange. When the slave exchange receives data from the master exchange or the backup exchange, the received data or the corresponding data previously stored in the slave exchange is selected for use on the basis of comparison of the information included in their update information. That is, the data stored in the slave exchange is sent to the exchange having sent the received data if the data stored in the slave exchange is selected for use; the received data is sent to the master exchange if the data received from the backup exchange is selected for use; and the received data is stored in the slave exchange if the received data is selected for use.

10 Claims, 2 Drawing Sheets

METHOD OF PREVENTING DATA INCONSISTENCY BETWEEN MASTER EXCHANGE DATA AND BACKUP EXCHANGE DATA

BACKGROUND OF THE INVENTION

The present invention relates to a method of preventing inconsistency between data maintained in a master exchange and in its backup exchange in a telecommunication system. The invention also relates to a telecommunication system comprising a master exchange including memory means for storing data and means for updating the stored data in response to data received from other parts of the system, a backup exchange having a data transmission connection with the master exchange, the backup exchange including means for receiving and storing in a memory means the data stored in the memory means of the master exchange for keeping a back-up copy of the data stored in the memory means of the master exchange.

The present invention relates particularly to maintaining data in exchanges of mobile communication systems, although the invention can also be utilized in other connections. The invention can be utilized in a telecommunication system where a backup exchange is designated for a master exchange to ensure the operation of the system, the backup exchange keeping a back-up copy of the data stored in a master exchange database. In some systems, the backup exchange can, if required, replace the master exchange by undertaking its tasks, whereby the operation of the entire system is not interrupted even if the master exchange is, for some reason, prevented from operation.

The problem in such a communication system described above is that if a data transmission connection is for some reason cut off, updatings performed in different parts of the system are not necessarily transmitted to both exchanges, whereby databases in the master exchange and in the backup exchange can include deviant information (for example relating to a particular subscriber), i.e. their data is mutually inconsistent.

SUMMARY OF THE INVENTION

The aim of the present invention is to solve the problem described above and provide a method of preventing data inconsistency between the master exchange and its backup exchange in a telecommunication system. This object is achieved by the method of the invention characterized by keeping a copy of the master exchange data in a slave exchange having a data transmission connection with the master exchange and the backup exchange, and when the slave exchange receives data from the master exchange or from the backup exchange: the received data or the corresponding data previously stored in the slave register is selected -for use on the basis of a comparison of information included in the update information of said data, the data stored in the slave exchange is sent to the exchange that has sent the received data if the data stored in the slave exchange is selected for use, the received data is sent to the master exchange if the data received from the backup exchange is selected for use, and the received data is stored in the slave exchange if the received data is selected for use.

The invention is based on the idea that when a copy of the master exchange data is kept in the backup exchange and also in the slave exchange having a data transmission connection with the master exchange and the backup exchange, the slave exchange can then detect a potential inconsistency between the master exchange and the backup exchange data on the basis of the update information in the data received by the slave exchange, and start eliminating the inconsistency. The method of the invention enables the prevention of the inconsistency in situations where disturbances occur in a telecommunication system. This improves the reliability of the system dramatically.

In a preferred embodiment of the invention, the decision on the data the slave exchange selects for use is based on an age stamp included in the update information of the data. The slave exchange selects for use the data which has last been updated. Thus, updatings performed to the data during disturbance can also be taken into account, and situations do not occur where an updating is lost because of a system disturbance.

In another preferred embodiment of the invention, the decision on the data the slave exchange selects for use depends on who has last updated data on the basis of the update information. Thus, it can be defined for example that the data updated by the operator is selected for use rather than the data updated by the subscriber himself.

The invention also relates to a telecommunication system wherein the method of the invention can be applied. The system of the invention is characterized in that the system comprises at least one slave exchange having a data transmission connection with the master exchange and the backup exchange, the slave exchange comprising: communication means for receiving data from the master exchange and the backup exchange, comparison means for selecting for use either the received data or corresponding data stored in a memory means of the slave exchange on the basis of the update information of said data, and processing means arranged:

- to send the data stored in the memory means of the slave exchange to the exchange having sent the received data when the comparison means have selected for use the data stored in the memory means of the slave exchange,
- to store the received data in the memory means of the slave exchange when the comparison means have selected for use the received data, and
- to send the received data to the master exchange when the comparison means have selected for use the data received from the backup exchange.

The preferred embodiments of the method and telecommunication system are disclosed in the attached dependent claims 2 to 3 and 5 to 7.

BRIEF DESCRIPTION OF THE DRAWINGS

The invention will be described in more detail by means of a preferred embodiment with reference to the accompanying figures, of which

DETAILED DESCRIPTION

Figure 1:
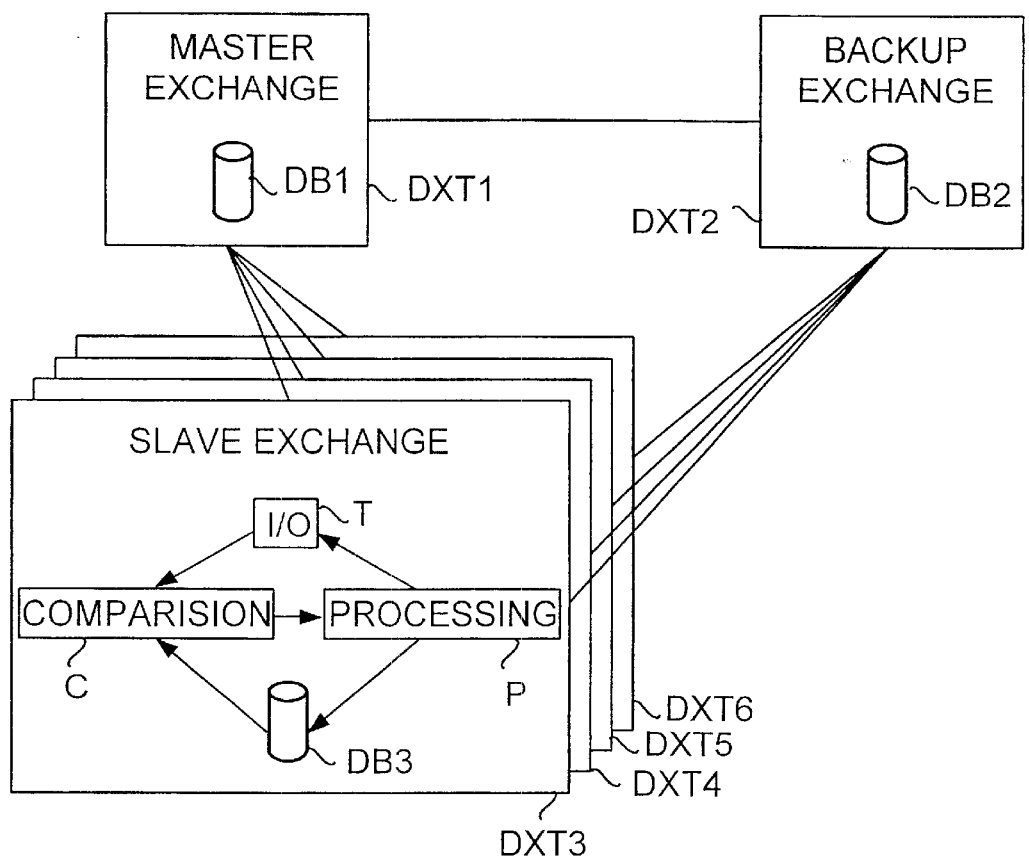
FIG. 1 shows a block diagram of a first preferred embodiment of the telecommunication system of the invention.

FIG. 1 shows a block diagram of a first preferred embodiment of the telecommunication system of the invention. The mobile telephone system presented in FIG. 1 can be for example a part of the TETRA network (TransEuropean Trunked Radio system), although the invention can also be applied in other connections.

A master exchange DXT1 in FIG. 1 has a data transmission connection with a backup exchange DXT2 and with slave exchanges DXT3 to DXT6. A database DB2 in the backup exchange DXT2 keeps a back-up copy of the data in a database DB1 in the master exchange DXT1.

The data to be maintained in the master exchange database DB1 contains information necessary for the operation of the system, such as subscriber information and/or group information. The individual subscriber information can include for example:

subscriber identity subscriber location information, i.e. information indicating the cell in which the subscriber is registered, and subscriber services information, such as information indicating types of calls the subscriber is entitled to.

The subscriber information is always stored in the data-base DB1 (the subscriber's home mobile telephone exchange) of the master exchange DXT1 and in the database DB2 of the backup exchange DXT2. Furthermore, if the subscriber is registered in some other exchange than the master exchange or the backup exchange, the information is also copied in said slave exchange.

The group information contains information regarding one or several groups of subscribers who, for example, often need to communicate with each other. Said subscribers have been defined as members of the same group in the system. Thus, it is very easy to make for example group calls, i.e. calls that all the group members can hear. The group information for a single group can include for example:

group identity a list of group members (for example a list of subscriber identities), and group area specification, i.e. information indicating the cells in the area of which the network supports the operation of the group.

The group information is always stored in the master exchange (i.e. in the home mobile telephone exchange of the group) and in the backup exchange. In addition, the information is copied in all the slave exchanges containing even a single cell in their area supporting the operation of the group.

In the case in FIG. 1, the data can be updated either in the master exchange DXT1 which transmits the updating to the backup exchange DXT2 and at least to the slave exchange DXT3, or in the slave exchange DXT3 which transmits the updating to the master exchange DXT1 which, in turn, transmits the updating onward. If the slave exchange DXT3 cannot contact the master exchange DXT1, the slave exchange then transmits the updating to the backup exchange DXT2. In that case, the backup exchange operates like the master exchange.

To avoid a situation where disturbances in a telecommunication system cause inconsistency between the data of the master exchange DXT1 and the backup exchange DXT2 (and possibly between the data of one or several slave exchanges), the slave exchange DXT3 is in the case in FIG. 1 arranged to control the updatings it receives. In accordance with the invention, a comparison unit C in the slave exchange DXT3 thus compares the update information included in the data received from the master exchange or the backup exchange via a telecommunication unit T with the update information of data previously stored in a database DB3 in the slave exchange, and decides on the basis of the said comparison whether to employ the received data or the data in the database.

The selection between the received data and the corresponding data stored in the database can be based on age stamps, the age stamps denoting the last updating of the data.

If the slave exchange DXT3 detects that more recent data than the data it has just received is stored in its database, it is obvious that the system is disturbed and causes the data in different exchanges to be mutually inconsistent. A processing unit P in the slave exchange then sends the data stored in the data base DB3 to the exchange having sent the obsolete data.

The slave exchange DXT3 detects inconsistency if it in any situation receives updated data from the backup exchange DXT2, because if the system operates in a normal manner it should receive updatings only from the master exchange DXT1. In this case, the processing unit P sends the received data to the master exchange DXT1.

The master exchange DXT1 and the backup exchange DXT2 are arranged to transmit all the data received from the slave exchange to all the exchanges with which they have a data transmission connection. The most recent data can thus be distributed to all the exchanges having a data transmission connection with the master exchange or the backup exchange.

Instead of selecting the data for use by the comparison based on the above described age stamps, the slave exchange can select the data for use in some other alternative manner, for example by using information indicating the update performer. If the slave exchange has to select for use either the data updated by the operator or, alternatively, the data updated by the subscriber, the slave exchange can be programmed to select for use the data updated by the operator.

Figure 2:
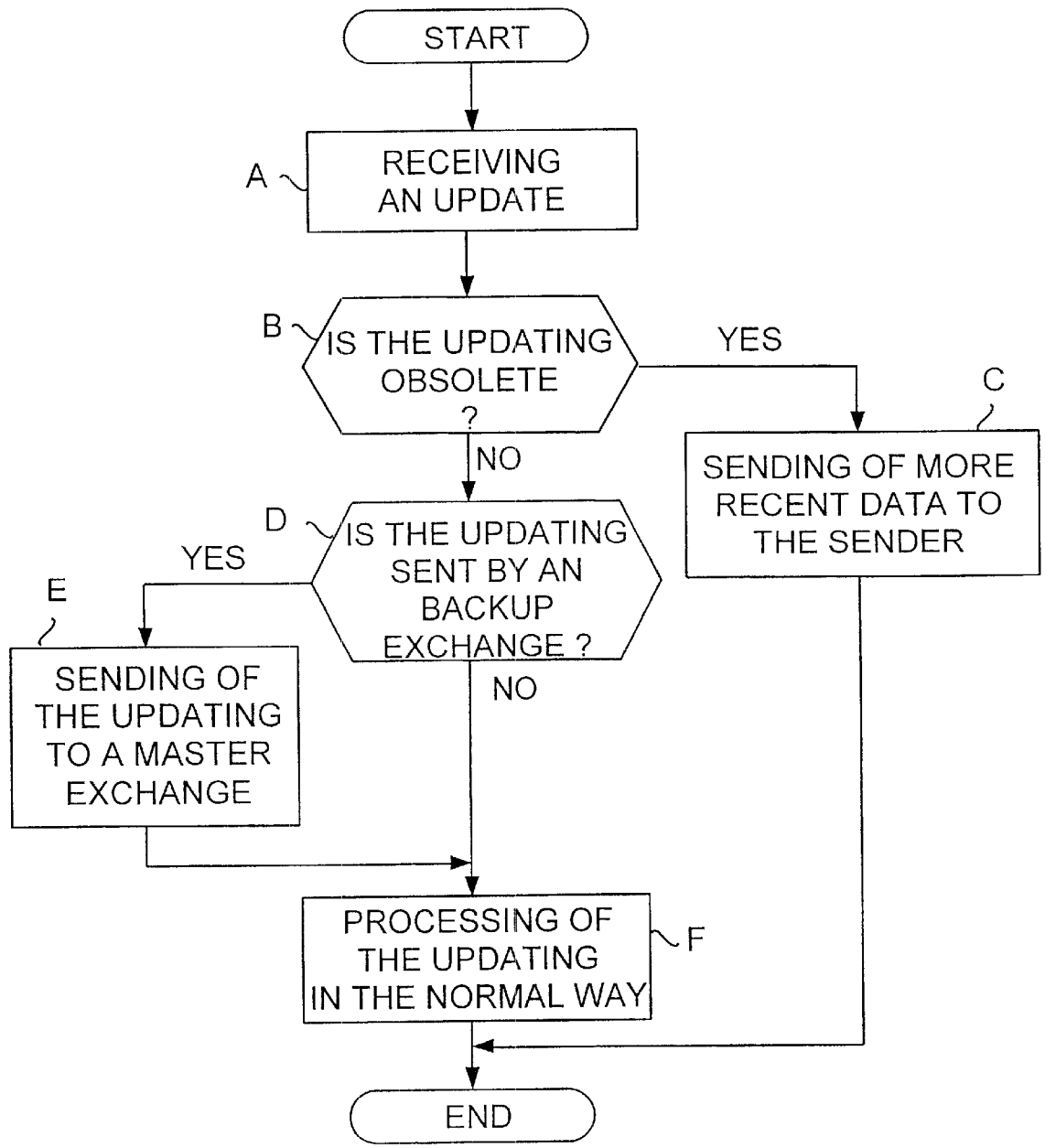
FIG. 2 shows a flow diagram of a first preferred embodiment of the method of the invention.

FIG. 2 shows a flow diagram of a first preferred embodiment of the invention. For example the slave exchange DXT3 in FIG. 1 can be controlled in a manner presented in the flow diagram in FIG. 2.

In block A, the slave exchange receives data, i.e. a new updating. Depending on the case, the updating can comprise a whole database or, alternatively, one or a few records in a database (regarding for example individual subscriber information).

In block B, the slave exchange compares the age stamp of the received data with the age stamp of the corresponding data previously maintained in its database.

If the age stamp of the data in the slave exchange database is more recent than the age stamp of the received data, the received updating is obsolete. In that case, the routine proceeds to block C, where the slave exchange sends the data maintained in its database to the exchange from where the obsolete data is received. In contrast, if the age stamp of the data in the slave exchange memory is older than the age stamp of the received data, the routine proceeds to block D where the origin of the received data is checked. If it is detected that a master exchange has sent the received data, the routine proceeds to block F.

In contrast, if it is detected that the backup exchange has sent the received data, the routine proceeds to block G where the slave exchange sends the received data to the master exchange. Next, the routine proceeds to block F.

In block F, the slave exchange updates the data maintained in its database with a new updating, i.e. with the received data.

Figure 3:
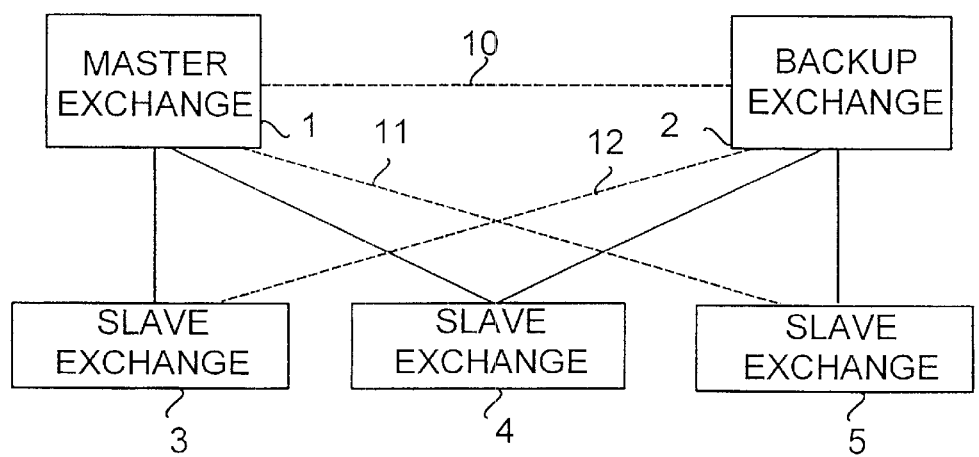
FIG. 3 illustrates the operation of the system of the invention in disturbance situation.

FIG. 3 illustrates the operation of the system of the invention in disturbance situation.

Since each slave exchange 3 to 5 in FIG. 3 operates in a manner described in the flow diagram in FIG. 2, updatings performed to the data of the slave exchange 5 are distributed to a master exchange 1 and up to its slave exchange 3 even if a connection 11 from the slave exchange 5 to the master exchange 1, a connection 12 from a backup exchange 2 to the slave exchange 3, and a connection 10 between the master exchange 1 and the backup exchange 2 are cut off simultaneously (illustrated by a dashed line).

When the backup exchange 2 detects that it is not able to transmit the data received from the slave exchange 5 to the master exchange (because of a defective connection) it operates like the master exchange, i.e. it transmits the received data to all the exchanges with which it has a data transmission connection. Consequently, the slave exchange 4 receives the data.

The slave exchange 4, in turn, detects that it has received data from the backup exchange 2, whereby it selects said data (the most recent updating) for use, and, in addition, also transmits it to the master exchange 1. The master exchange 1, in turn, sends the received data to all the exchanges with which it has a data transmission connection, i.e. also to the slave exchange 3. Thus, a break in the data transmission connection between the master exchange 1 and the backup exchange 2 does not significantly injure the operation of the system.

It is obvious that the above description and the related figures are only intended to illustrate the present invention. Telecommunication systems also comprise other information besides the above mentioned subscriber information and group information presented by way of example, and to the transmission of which the present invention can be applied. A variety of modifications and variations will be apparent to those skilled in the art without deviating from the scope and spirit of the invention disclosed in the appended claims.

What is claimed is:

1. A method of preventing inconsistency between the data maintained in a master exchange and its backup exchange in a telecommunication system, the method comprising:
   keeping a copy of the master exchange data in a slave exchange having a data transmission connection with the master exchange and the backup exchange, and when the slave exchange receives data from the master exchange or from the backup exchange:
      selecting the received data or corresponding data previously stored in the slave exchange for use on the basis of a comparison of information included in update information of the received data and the corresponding data;
      if the corresponding data stored in the slave exchange is selected for use, sending the corresponding data stored in the slave exchange to the exchange that has sent the received data;
      if the data received from the backup exchange is selected for use, sending the received data to the master exchange; and
      if the received data is selected for use, storing the received data in the slave exchange,
   wherein the master exchange, backup exchange, and the slave exchange are mobile telephone exchanges.

2. The method of claim 1, wherein the selecting is performed to select the data being last updated on the basis of the update information.

3. The method of claim 1, wherein the selecting of the received or corresponding data previously stored in the slave exchange is accomplished by comparing update performers included in the update information, and by selecting for use the data whose update performer is highest in a predetermined hierarchy.

4. A telecommunication system, comprising:
   a master exchange including a memory for storing data and means for updating the stored data in response to data received from other parts of the system;
   a backup exchange in data transmission connection with the master exchange and a slave exchange, the backup exchange including a memory for receiving and storing a backup copy of data stored in the memory of the master exchange;
   at least one slave exchange having a data transmission connection with the master exchange and the backup exchange, the slave exchange comprising:
      communication means for receiving data from the master exchange and the backup exchange;
      comparison means for selecting for use either the received data or corresponding data stored in a memory of the slave exchange on the basis of a comparison of update information of the received data and the corresponding data; and
      processing means arranged:
         to send the corresponding data stored in the memory of the slave exchange to the exchange having sent the received data when the comparison means has selected for use the data stored in the memory means of slave exchange,
         to store the received data in the memory of the slave exchange when the comparison means have selected for use the received data, and
         to send the received data to the master exchange when the comparison means have selected for use the data received from the backup exchange,
   wherein the master exchange, backup exchange, and the slave exchange are mobile telephone exchanges.

5. The system of claim 4, wherein the comparison means are arranged to select for use the data being last updated on the basis of an age stamp included in the update information.

6. The system of claim 4, wherein the comparison means are arranged to select for use the data whose update performer is highest in a predetermined hierarchy.

7. The system of claim 4, wherein the system is a mobile communication system, and the data consists of subscriber data of the system.

8. A method of preventing inconsistency between data maintained in a master exchange and a corresponding backup exchange in a telecommunication system, the method comprising:
   maintaining a copy of data stored in the master exchange in a slave exchange, which has a transmission coupling to the master exchange and the backup exchange, and when the slave exchange receives data from the master exchange or from the backup exchange:
      selecting the received data or corresponding data previously stored in the slave exchange based on a comparison of update information of the received data and the corresponding data;
      if the previously stored data is selected, sending the selected data to the exchange that sent the received data;
      if the received data is selected and it was received from the backup exchange, sending the received data to the master exchange; and
      if the received data is selected for use, storing the received data in the slave exchange,
   wherein the master exchange, backup exchange, and the slave exchange are mobile telephone exchanges.

9. The method of claim 8, wherein the selecting is performed to select the data being last updated based on the update information.

10. The method of claim 8, wherein the selecting is accomplished by comparing update performers included in the update information, and by selecting the data whose update performer is highest in a predetermined hierarchy.

* * * * *